United States Patent
Takayanagi et al.

(10) Patent No.: US 7,890,977 B2
(45) Date of Patent: Feb. 15, 2011

(54) SIGNAL PROCESSING APPARATUS AND SIGNAL PROCESSING METHOD FOR UPCONVERTING A PLURALITY OF STORED CONTENT DATA

(75) Inventors: Daisuke Takayanagi, Kawasaki (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 12/116,374

(22) Filed: May 7, 2008

(65) Prior Publication Data

US 2008/0281449 A1    Nov. 13, 2008

(30) Foreign Application Priority Data

May 8, 2007    (JP) .............................. 2007-123409

(51) Int. Cl.
```
G06F 3/00      (2006.01)
G06F 13/00     (2006.01)
H04N 5/445     (2006.01)
H04N 17/00     (2006.01)
H04N 17/02     (2006.01)
H04N 7/01      (2006.01)
H04N 11/20     (2006.01)
```
(52) U.S. Cl. .................... 725/46; 348/441; 348/445; 348/447; 348/458; 348/180

(58) Field of Classification Search ................ 348/180, 348/441–447, 458, 473–475; 725/9, 13, 725/24, 46, 61
See application file for complete search history.

(56) References Cited

U.S. PATENT DOCUMENTS

| | | | |
|---|---|---|---|
| 6,370,198 B1 * | 4/2002 | Washino | 348/441 |
| 2002/0118296 A1 * | 8/2002 | Schwab et al. | 348/441 |

FOREIGN PATENT DOCUMENTS

| | | | |
|---|---|---|---|
| JP | 7-321662 | A | 12/1995 |
| JP | 9-261071 | A | 10/1997 |
| JP | 2006-086639 | A | 3/2006 |

* cited by examiner

*Primary Examiner*—Hai V. Tran
(74) *Attorney, Agent, or Firm*—Canon U.S.A., Inc., IP Division

(57) ABSTRACT

A signal processing apparatus that upconverts a plurality of content data includes an operation unit configured to receive an operation instruction from a user, a generating unit configured to generate user's preference information based on an operation history corresponding to the operation instruction received by the operation unit, a processing unit configured to upconvert the plurality of content data, and a control unit configured to calculate a preference level of each content data to preferentially upconvert content data having a high preference level based on the preference information generated by the generating unit and content information about each content data.

14 Claims, 19 Drawing Sheets

FIG.6

| PROGRAM TITLE | GENRE | PREFERENCE GENRE (GENRE) | PREFERENCE GENRE (KEYWORD) | PREFERENCE LEVEL (IN TOTAL) | PROCESSING ORDER |
|---|---|---|---|---|---|
| JAPANESE HISTORY | CINEMA | 5 | 4 | 9 | 1 |
| GENESIS OF EARTH | DOCUMENTARY | 3 | 3 | 6 | 2 |
| GOURMET MATCHUP | DRAMA | 4 | 1 | 5 | 3 |

FIG.8

| DATA STRUCTURE | BIT RATE | BIT STRING |
|---|---|---|
| component_descriptor(){ | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for(i=0;i<N;I++){ | | |
|         text_char | 8 | uimsbf |
|     } | | |
| } | | |

FIG.9

| stream_content | component_type | REMARKS |
|---|---|---|
| 0x00 | 0x00-0xFF | RESERVED FOR FUTURE USE |
| 0x01 | 0x00 | RESERVED FOR FUTURE USE |
| 0x01 | 0x01 | VIDEO IMAGE 480i (525i), ASPECT RATIO 4:3 |
| 0x01 | 0x02 | VIDEO IMAGE 480i (525i), ASPECT RATIO 16:9 WITH PAN VECTOR |
| 0x01 | 0x03 | VIDEO IMAGE 480i (525i), ASPECT RATIO 16:9 WITHOUT PAN VECTOR |
| 0x01 | 0x04 | VIDEO IMAGE 480i (525i), ASPECT RATIO > 16:9 |
| 0x01 | 0x05-0xA0 | RESERVED FOR FUTURE USE |
| 0x01 | 0xA1 | VIDEO IMAGE 480p (525p), ASPECT RATIO 4:3 |
| 0x01 | 0xA2 | VIDEO IMAGE 480p (525p), ASPECT RATIO 16:9 WITH PAN VECTOR |
| 0x01 | 0xA3 | VIDEO IMAGE 480p (525p), ASPECT RATIO 16:9 WITHOUT PAN VECTOR |
| 0x01 | 0xA4 | VIDEO IMAGE 480p (525p), ASPECT RATIO > 16:9 |
| 0x01 | 0xA5-0xB0 | RESERVED FOR FUTURE USE |
| 0x01 | 0xB1 | VIDEO IMAGE 1080i (1125ip), ASPECT RATIO 4:3 |
| 0x01 | 0xB2 | VIDEO IMAGE 1080i (1125ip), ASPECT RATIO 16:9 WITH PAN VECTOR |
| 0x01 | 0xB3 | VIDEO IMAGE 1080i (1125ip), ASPECT RATIO 16:9 WITHOUT PAN VECTOR |
| 0x01 | 0xB4 | VIDEO IMAGE 1080i (1125ip), ASPECT RATIO > 16:9 |

FIG.10

| VIDEO DATA ENCODING SCHEME | component_type | VIDEO FORMAT | ASPECT RATIO | REFERENCE TIME NECESSARY FOR UPCONVERTING CONTENT CORRESPONDING TO 1 HOUR |
|---|---|---|---|---|
| MPEG-2 Video | 0xB2, 0xB3 | 1080i | 16:9 | 2.5 HOURS |
| | 0xA2, 0xA3 | 480p | 16:9 | 4 HOURS |
| | 0x02, 0x03 | 480i | 16:9 | 4.5 HOURS |
| | 0x01 | | 4:3 | 4.5 HOURS |
| | 0xD2, 0xD3 | 720p | 16:9 | 3 HOURS |
| | 0xC2, 0xC3 | 1080p | 16:9 | 2 HOURS |

FIG.12

| PROGRAM TITLE | component_type | VIDEO FORMAT | RECORDING TIME | ESTIMATED PROCESSING TIME | PROCESSING ORDER |
|---|---|---|---|---|---|
| GENESIS OF EARTH | 0xC2 | 1080p | 1 HOUR | 2 HOURS | 1 |
| GOURMET MATCHUP | 0xB2 | 1080i | 2 HOURS | 5 HOURS | 2 |
| JAPANESE HISTORY | 0xA2 | 480p | 3 HOURS | 12 HOURS | 3 |

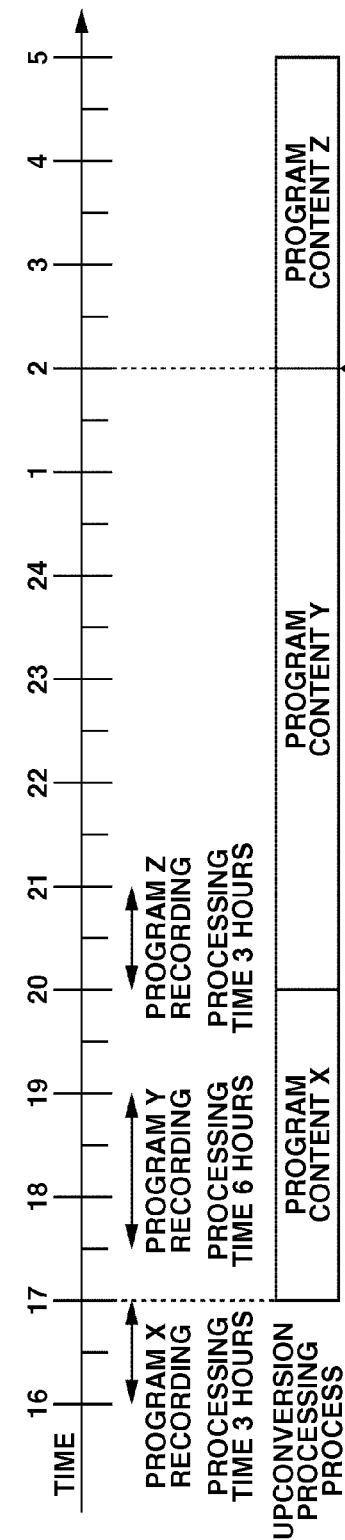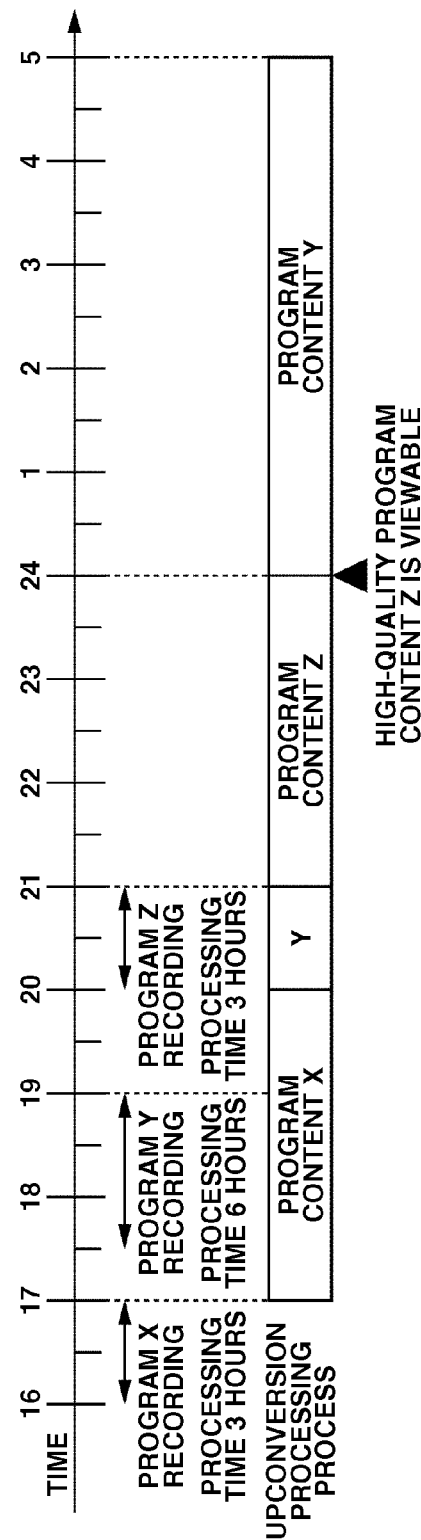

FIG.16

| PROGRAM TITLE | GENRE | PREFERENCE LEVEL | PRIORITY POINT 1 | ESTIMATED PROCESSING TIME | PRIORITY POINT 2 | TOTAL PRIORITY POINT | PROCESSING ORDER |
|---|---|---|---|---|---|---|---|
| GENESIS OF EARTH | DOCUMENTARY | 6 | 6 | 2 HOURS | 6 | 12 | 1 |
| JAPANESE HISTORY | CINEMA | 9 | 9 | 12 HOURS | 2 | 11 | 2 |
| GOURMET MATCHUP | DRAMA | 5 | 5 | 5 HOURS | 5 | 10 | 3 |

FIG.17

| ESTIMATED PROCESSING TIME | PRIORITY POINT 2 |
|---|---|
| 0 HOURS TO LESS THAN 1 HOUR | 8 |
| 1 HOUR TO LESS THAN 2 HOURS | 7 |
| 2 HOURS TO LESS THAN 4 HOURS | 6 |
| 4 HOURS TO LESS THAN 6 HOURS | 5 |
| 6 HOURS TO LESS THAN 8 HOURS | 4 |
| 8 HOURS TO LESS THAN 10 HOURS | 3 |
| 10 HOURS TO LESS THAN 15 HOURS | 2 |
| 15 HOURS TO LESS THAN 24 HOURS | 1 |
| MORE THAN 24 HOURS | 0 |

FIG.19

STORED CONTENT LIST

SELECT CONTENT TO BE UPCONVERTED

| RECORDING DATE AND TIME | GENRE | PROGRAM NAME | UPCONVERT | PROCESSING ORDER |
|---|---|---|---|---|
| 10/19 (THURSDAY) 13:30~15:30 | CINEMA | PROGRAM A | NOT-UPCONVERTED | 1 |
| 10/19 (THURSDAY) 21:00~22:54 | DRAMA | PROGRAM B | UPCONVERTED | FINISHED |
| 10/20 (FRIDAY) 16:50~16:55 | VARIETY SHOW | PROGRAM C | NOT-UPCONVERTED | 3 |
| 10/21 (SATURDAY) 20:00~20:30 | NEWS | PROGRAM D | NOT-UPCONVERTED | 2 |
| 10/21 (SATURDAY) 21:00~23:05 | ANIMATION | PROGRAM E | UPCONVERTED | FINISHED |

SIGNAL PROCESSING APPARATUS AND SIGNAL PROCESSING METHOD FOR UPCONVERTING A PLURALITY OF STORED CONTENT DATA

BACKGROUND OF THE INVENTION

1. Field of the Invention

The present invention relates to a signal processing apparatus and a signal processing method configured to upconvert stored content data.

2. Description of the Related Art

Currently, the maximum number of effective pixels specified in the high definition (HD) standards employed in Japanese digital broadcasting is 1920×1080. Furthermore, for example, Nihon Hoso Kyokai (NHK) has conducted research about a technique related to high definition content called a super high definition (SHD) and ultra-high definition (UHD) that realizes an image of a larger number of pixels.

That is, the maximum number of effective pixels of the SHD (or UHD) is 7680×4320 (8 k×4 k), which is far beyond the HD standard. Further, a digital cinema having a 4096×2160 (4 k×2 k) video format has been developed. Regarding a sound quality, research has been underway to develop a 22.2 multi-channel system which realizes three-dimensional sounds of a quality higher than sounds generated with current 5.1-channel surround-sound techniques.

In recent years, research has been conducted into techniques for enhancing (upconverting) a quality of video images of a conventional standard definition (SD) format and for enhancing a quality (upconverting) of low-quality sounds. In addition, various techniques relating to upconversion processing have been developed for realizing more realistic and powerful video images and sounds using intricate algorithms.

For example, a technique for upconverting an SD image to an HD image by classification adaptive processing is discussed (see Japanese Patent Application Laid-Open No. 07-321662). Further, a technique for improving a sound quality that converts a format of audio data to reproduce delicate sounds or nuance is discussed (see Japanese Patent Application Laid-Open No. 09-261071).

Upconverting methods are roughly classified into a real-time processing method that processes content data while reproducing the data and a method for processing content data over time instead of processing in real time. In a case of performing processing with a relatively low load such as image or sound quality correction currently executed in general digital television receivers, image or audio data is processed in real time while broadcast signals are received.

However, in the future, it is anticipated that a digital television receiver or other peripheral devices will be equipped with a function for executing upconversion processing (image/sound quality raising processing) that is difficult to execute in real time because of its high processing load. Since the upconversion processing with a high processing load is difficult to perform in real time, content data is temporarily stored in a recording medium and then, the stored content data is gradually upconverted.

In such a case, if the upconversion processing is time consuming, the upconversion processing may not be completed by the time a user desires to reproduce the content data. In particular, in the case where a plurality of content data are to be upconverted in turn, if a content which a user desires to reproduce is placed at a later point in the content data, the desired content may not be upconverted immediately.

Accordingly, it is desirable that user's preferences are reflected so that the desired content is preferentially upconverted.

For example, Japanese Patent Application Laid-Open No. 2006-086639 discusses a technique related to user's preferences which deletes contents from a storage unit or compress them in an ascending order of user's preference level to save a capacity of a recording medium.

As described above, if the upconversion processing is time consuming, there arises a problem that content data cannot be reproduced at a timing a user wants because the upconversion is not yet finished. In particular, in the case of upconverting a plurality of content data, a content that a user wants to reproduce may not be immediately upconverted.

SUMMARY OF THE INVENTION

The present invention is directed to a signal processing apparatus and a signal processing method which can upconvert a plurality of stored content data with an appropriate procedure.

According to an aspect of the present invention, a method for upconverting a plurality of content data includes receiving an operation instruction from a user, generating user's preference information based on an operation history corresponding to a received operation instruction, upconverting the plurality of content data, calculating a preference level of each content data based on generated preference information and content information about each content data, and performing control to preferentially upconvert content data having a high preference level.

According to another aspect of the present invention, a method for upconverting a plurality of content data includes calculating an estimated processing time necessary to upconvert each of the plurality of content data, upconverting the plurality of content data, and performing control to preferentially upconvert content data having a shortest estimated processing time.

According to yet another aspect of the present invention, a method for upconverting a plurality of content data includes receiving an operation instruction from a user, determining an order of upconverting the plurality of content data based on a received operation instruction, and upconverting the plurality of content data in a determined order.

According to an exemplary embodiment of the present invention, it is possible to upconvert a plurality of stored content data with an appropriate procedure.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of determined upconversion processing order.

FIG. 8 illustrates an example of a data structure of a component descriptor.

FIG. 9 illustrates details of "stream_content" and "component_type".

FIG. 10 illustrates an example of a reference processing time information table stored in a processing time information storage unit of FIG. 7.

FIG. 12 illustrates an example of determined upconversion processing order.

FIGS. 13A and 13B illustrate advantages of the second exemplary embodiment.

FIG. 16 illustrates an example of calculated results of a priority point 1 and a priority point 2.

FIG. 17 illustrates an example relationship between an estimated processing time and the priority point 2.

FIG. 19 illustrates a screen example displaying a list of stored contents.

DETAILED DESCRIPTION OF THE EMBODIMENTS

Various exemplary embodiments, features, and aspects of the invention will be described in detail below with reference to the drawings.

A first exemplary embodiment of the present invention describes a determination of the processing order of content data as an upconversion target based on user's preference information.

Figure 1:
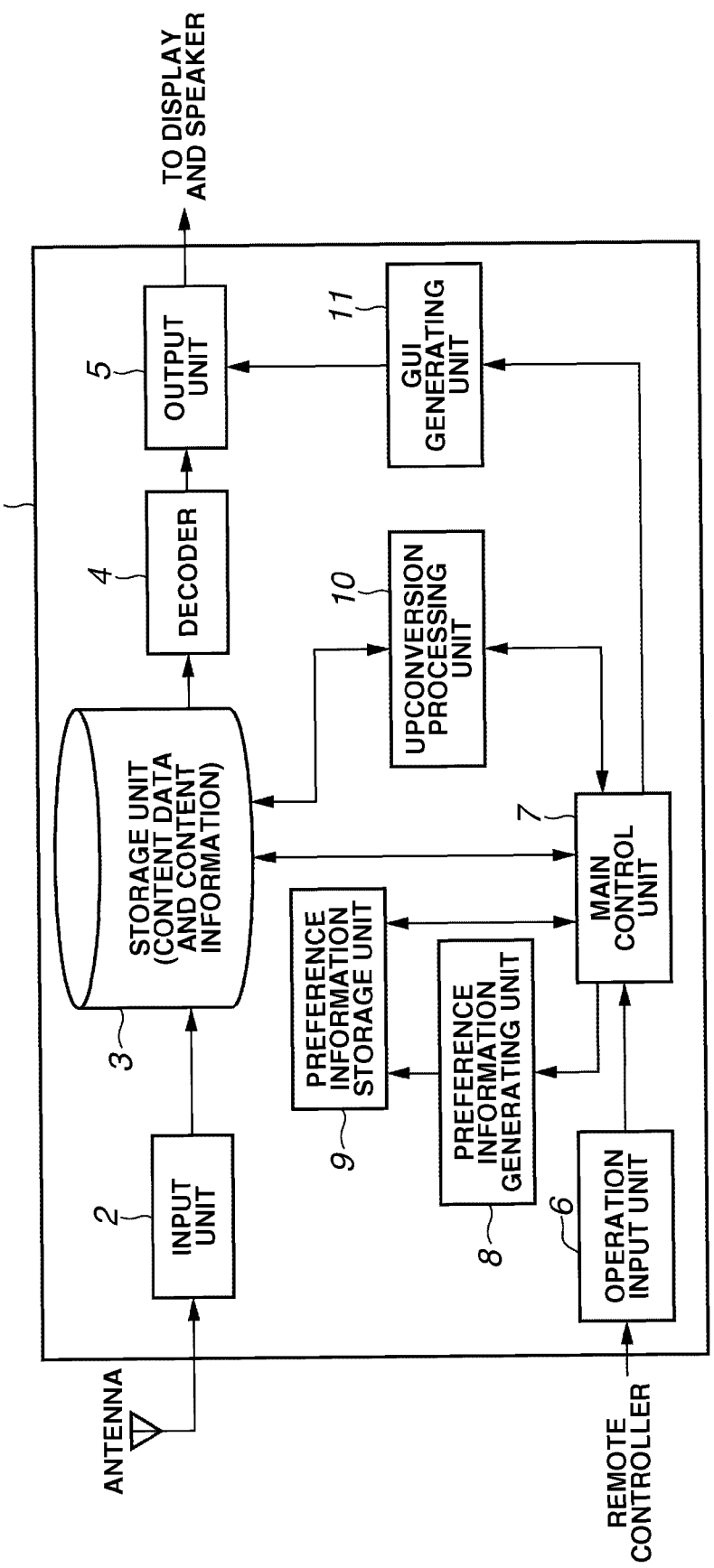
FIG. 1 is an example block diagram illustrating a configuration of a signal processing apparatus according to a first exemplary embodiment of the present invention.

FIG. 1 is a block diagram illustrating a configuration of a signal processing apparatus 1 of the first exemplary embodiment. The signal processing apparatus 1 can store content data like a hard disk recorder.

An input unit 2 receives broadcast signals (terrestrial digital broadcasting, satellite digital broadcasting, broadband broadcasting, etc.) through an antenna (or a cable or the Internet). The input unit 2 includes a tuner, and executes demodulation and error correction on the broadcast signals to generate transport stream (TS) data of a TS format. In the broadcast signals, content information such as program information (a program title, a genre, etc.) as well as video data or audio data are superimposed.

A storage unit (memory unit) 3 is, for example, a large-capacity storage device such as a hard disk drive which stores content data of the TS format (TS data) received from the input unit 2.

The content data stored in the storage unit 3 can be managed on a program (content) basis. Further, the storage unit 3 also stores content information such as program information regarding each content data (a program title, a genre, etc.). However, the content information can be stored in another storage unit that is different from the storage unit 3. As long as the storage unit 3 has a drive configuration suitable for storage, the number of drives and drive types are not particularly limited.

The content information includes service information (SI) specified by the Association of Radio Industries and Business (ARIB) standards related to digital broadcasting, for example. The SI includes a table called an event information table (EIT).

A descriptor used in the EIT includes a short form event descriptor (indicating a program title and a brief summary of a program) and an extended form event descriptor (indicating detailed information about a program for each item). Various kinds of additional information regarding program contents such as a program title, a broadcast time, program information, and genre information are described in the EIT. A user can generate an electronic program guide (EPG) showing a list of scheduled programs or search for a desired program using an application based on the above-described information in the SI.

A decoder 4 decodes video data and audio data in content data of each program stored in the storage unit 3. A graphical user interface (GUI) generating unit 11 generates various types of GUI data according to instructions from a main control unit 7. An output unit 5 outputs a video signal and an audio signal decoded by the decoder 4 to a display (display device) and a speaker, respectively. Further, the output unit 5 has a function of combining the GUI data with the video signal from the decoder 4.

An operation input unit 6 is a user interface that helps a user operate the signal processing apparatus 1. For example, the operation input unit 6 receives a signal from a remote controller to accept an operation instruction from a user, and then transfers the signal to the main control unit 7. Further, in response to operations on various operation buttons provided in a main body of the signal processing apparatus 1, the operation input unit 6 notifies the main control unit 7 of the operation instruction from a user.

The main control unit 7 functions as a central processing unit that performs control over the signal processing apparatus 1, such as controlling the storage unit 3 to store content data or controlling operations of an upconversion processing unit 10 in response to the operation instruction from a user.

A preference information generating unit 8 generates information about user's preferences based on a user's operation history (program search history, viewing history, etc.), for example, information about user's preferences based on genre or keywords input by a user to search for a desired program. A preference information storage unit 9 stores preference information generated by the preference information generating unit 8. The preference information storage unit 9 can be integrated with the storage unit 3.

The upconversion processing unit 10 upconverts content data stored in the storage unit 3. The content data upconverted by the upconversion processing unit 10 is stored again in the storage unit 3.

The upconversion processing refers to quality raising (image/sound quality improving processing) which is difficult to complete in real time, namely quality raising carried out for a longer time than an actual playing time of each content. For example, it refers to image quality raising processing with a high processing load which references a plurality of video frames to reproduce details so that the frames can be converted into high-definition video images. In such cases, a plurality of algorithms is used. Accordingly, it is difficult to complete upconversion processing in real time. Further, in the case of performing complicated sound quality raising processing to faithfully reproduce original sounds or reproduce sounds with realistic sensation, it is also difficult to complete the processing in real time.

Figure 2:
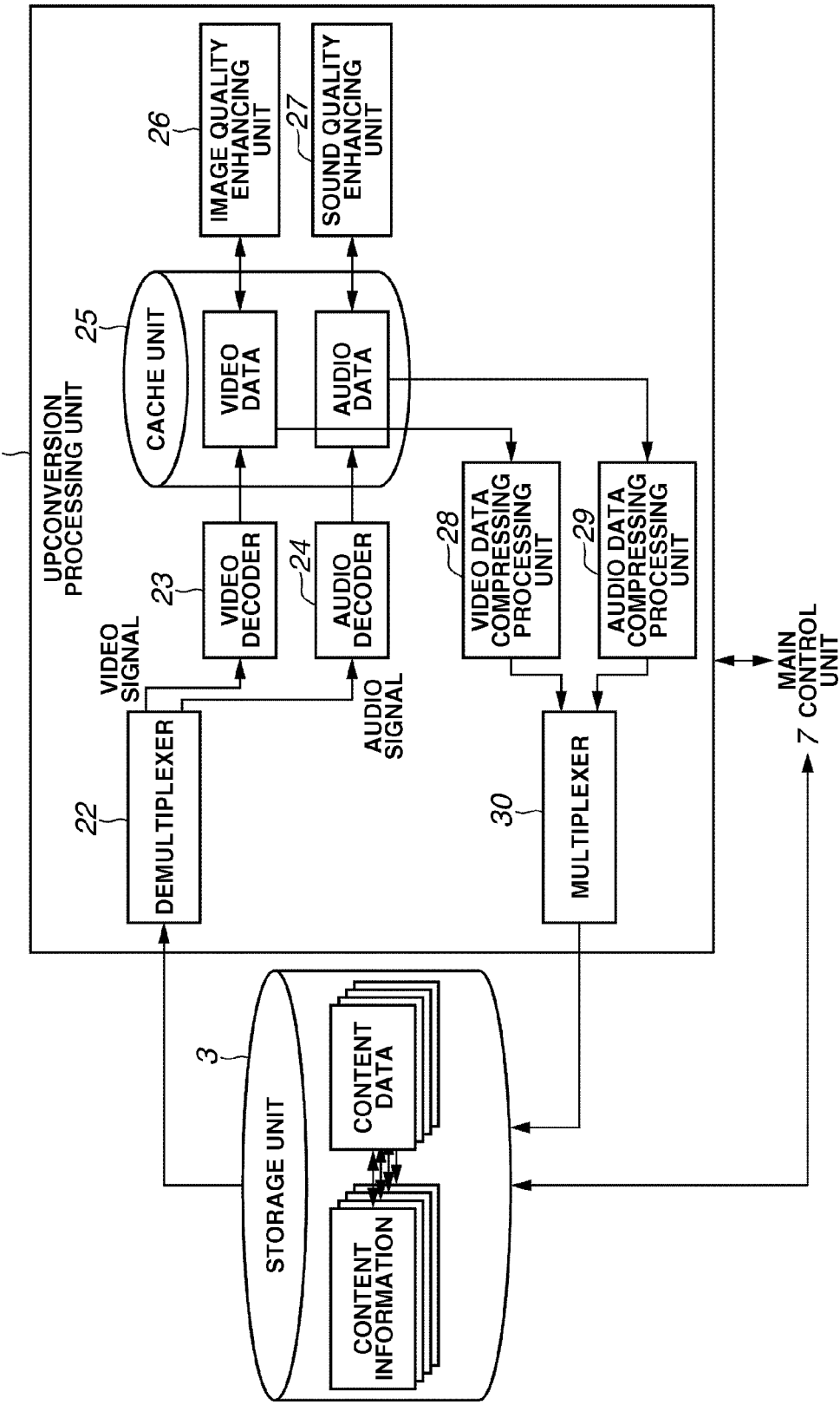
FIG. 2 is an example block diagram illustrating an internal configuration of an upconversion processing unit of FIG. 1.

FIG. 2 is a block diagram illustrating an internal configuration of the upconversion processing unit 10 of FIG. 1. The main control unit 7 checks preference information stored in the preference information storage unit 9 against content information stored in the storage unit 3 to determine an upconversion processing order of the plurality of content data in the storage unit 3. Then, the main control unit 7 controls operations of the upconversion processing unit 10 to execute the upconversion processing in the determined order.

The upconversion processing unit 10 reads content data which is an upconversion target from the storage unit 3. A demultiplexer 22 separates the content data read from the storage unit 3 into a video signal and an audio signal. A video decoder 23 and an audio decoder 24 decode the video signal and audio signal sent from the demultiplexer 22, respectively.

The video data and audio data decoded by the video decoder 23 and the audio decoder 24 are temporarily stored in a cache unit 25. An image quality enhancing unit 26 upconverts (enhances an image quality of) video data stored in the cache unit 25 and then stores the upconverted data again in the cache unit 25. A sound quality enhancing unit 27 upconverts (enhances a sound quality of) audio data stored in the cache unit 25 and then stores the upconverted data again in the cache unit 25.

The upconverted video data and audio data are compressed by a video data compressing unit 28 and an audio data compressing unit 29, respectively. A multiplexer 30 multiplexes the compressed video data and audio data and stores the resultant data in the storage unit 3.

Next, the operation for generating preference information based on a user's operation history is described. In the present embodiment, information such as genre information or keywords input by a user during the program search is used as the preference information. Here, any information that reflects user's preferences can be used, and the present invention is not limited to this example.

Figure 3:
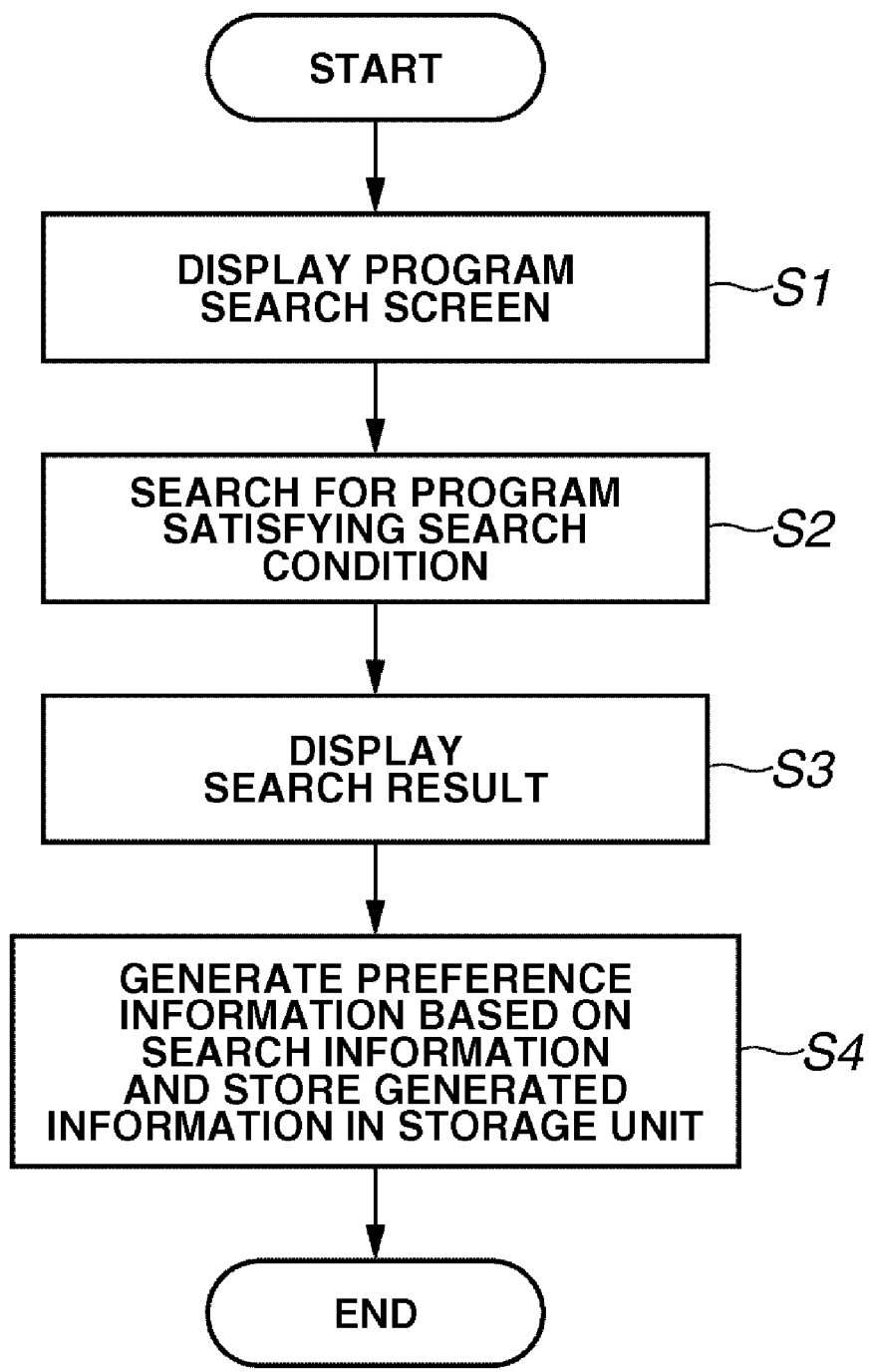
FIG. 3 is an example flowchart illustrating an operation in which a main control unit of FIG. 1 acquires user's preference information.

FIG. 3 is a flowchart illustrating an operation for generating preference information based on a user's operation history. In step S1, the main control unit 7 causes the GUI generating unit 11 to generate a program search screen in response to a user's instruction to search for a desired program, and displays the program search screen on a display. A user can enter a genre (cinema, sports, etc.) or a keyword (performer's name etc.) to designate a search condition.

In step S2, if a user instructs to start searching, the main control unit 7 searches for programs that meet the designated search condition. Subsequently, in step S3, the main control unit 7 displays a list of programs that meet the designated search condition as a search result on the display. In step S4, the preference information generating unit 8 generates user's preference information based on search information and stores the generated information in a preference information management table of the preference information storage unit 9.

Figure 4:
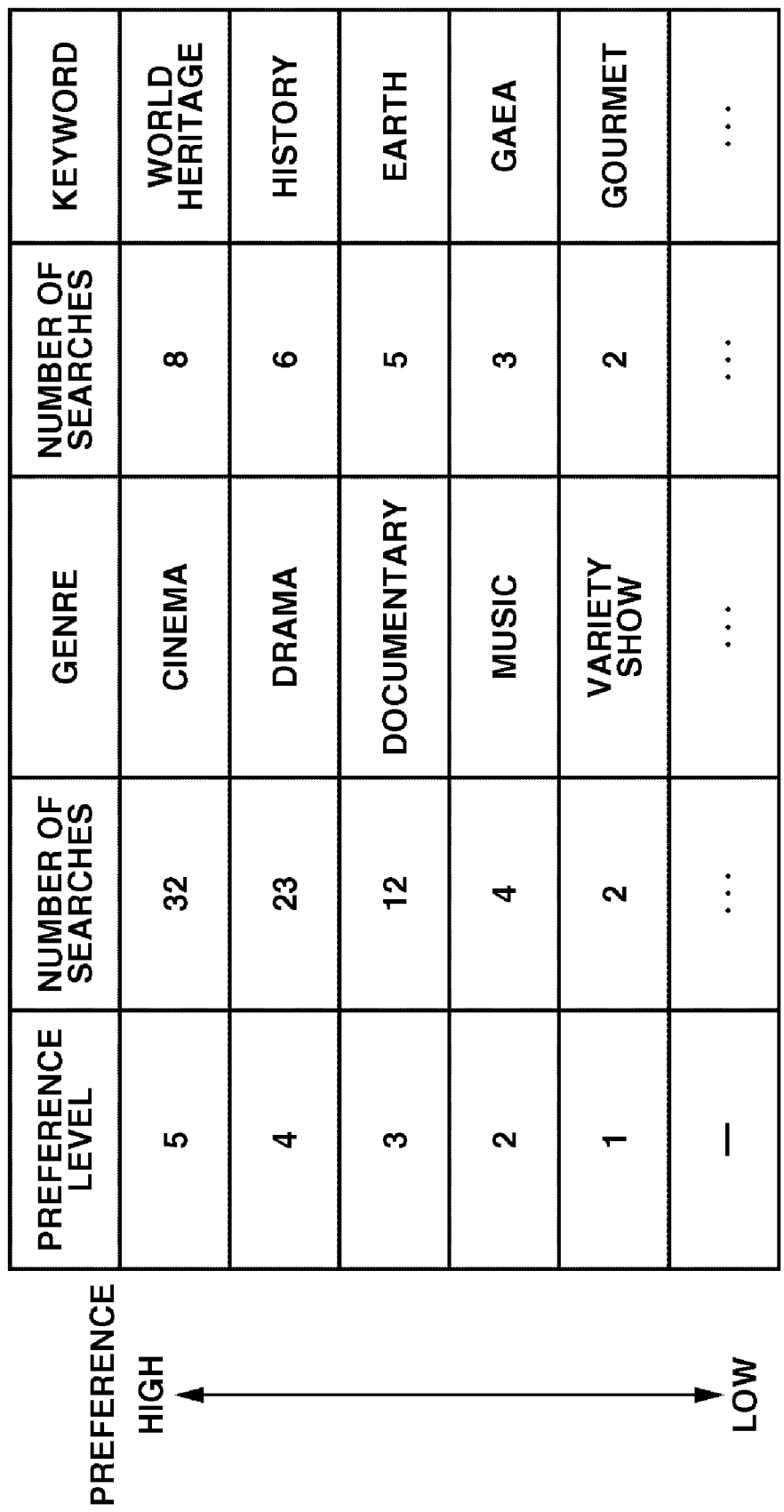
FIG. 4 illustrates an example of a preference information management table.

FIG. 4 illustrates an example of the preference information management table. Genre and keyword, and a number of times the search for programs is executed using this information are recorded in the preference information management table. Further, preference levels 5 to 1 are recorded according to the number of searches. In the present embodiment, a genre and a keyword which are frequently searched for, are used to reflect user's interests. Thus, a high preference level is assigned to the genre and the keyword. For example, the genre "cinema" and the keyword "world heritage", which are most searched for, have the preference level 5.

In the present embodiment, data is classified into two categories, a genre and a keyword, but the present invention is not limited thereto. For example, the category "keyword" can be further divided into plural categories such as a program title, program information, and a performer. Further, in the present embodiment, a same preference level is assigned to each category, but it is possible to perform weighting such as setting the maximum preference level of the genre to 5 and the maximum preference level of the keyword to 10. Further, the number of searches itself can be used as a preference level.

Figure 5:
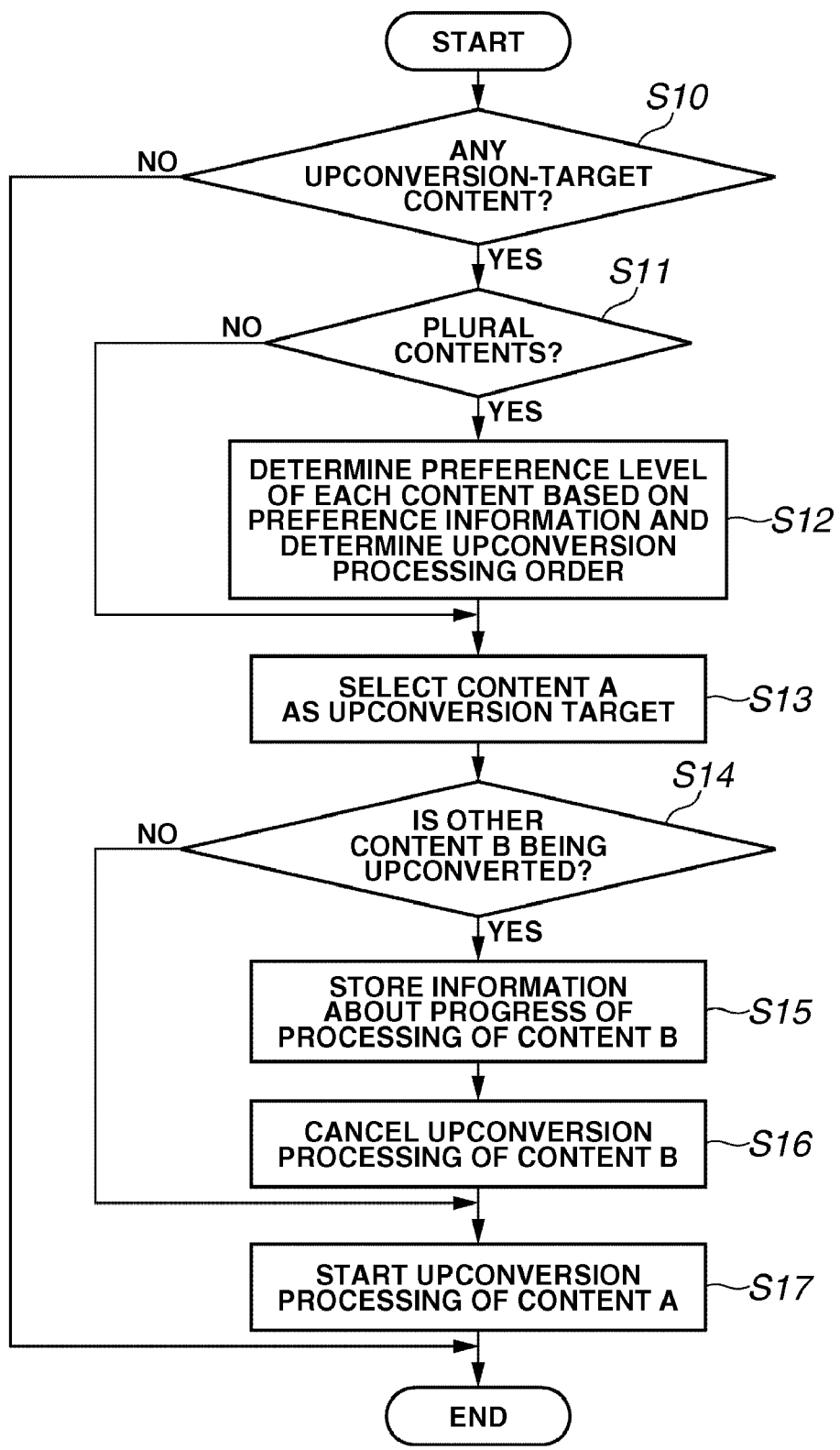
FIG. 5 is an example flowchart illustrating an upconversion processing procedure.

Next, how the main control unit 7 determines the upconversion processing order of a plurality of content data is described. FIG. 5 is a flowchart illustrating a procedure for determining the upconversion processing order through executing the upconversion processing. Further, the upconversion processing order can be determined at an arbitrary timing, for example, when recording of a certain program is finished, at a preset time, or when a user issues an instruction for upconversion processing.

In step S10, the main control unit 7 determines whether the storage unit 3 stores upconversion-target content data. A processing completion flag can be set to content data that has been upconverted in order to enable identifying of the content data not yet upconverted. If the storage unit 3 stores upconversion-target content data (YES in step S10), the processing advances to step S11.

In step S11, the main control unit 7 checks the number of conversion-target content data. If the storage unit 3 stores only one upconversion-target content data (NO in step S11), in step S13, the main control unit 7 determines content data A as an upconversion target.

On the other hand, if the storage unit 3 stores a plurality of upconversion-target content data (YES in step S11), in step S12, the main control unit 7 checks preference information stored in the preference information storage unit 9 against stored content information in the storage unit 3 and determines the upconversion processing order. FIG. 6 illustrates an example of the upconversion processing order determined by the main control unit 7.

The main control unit 7 checks whether each item in the preference information management table matches content information of each content data. If matched, the main control unit 7 adds up values of the preference levels of categories. As for the program "Japanese History", for example, the genre "cinema" has a preference level of 5, and the keyword "history" has a preference level of 4, so the total preference level is 9. The main control unit 7 determines the upconversion processing order so that a content having a higher preference level in total is processed earlier.

Next, in step S13, the main control unit 7 determines content data which is at the top of the upconversion processing order as content data A to be upconverted first.

In step S14, the main control unit 7 inquires of the upconversion processing unit 10 as to whether another content data B is being upconverted. More specifically, the main control unit 7 makes an inquiry about whether the upconversion processing unit 10 is operating. If the upconversion processing unit 10 is operating, the main control unit 7 inquires of the upconversion processing unit 10 as to content information of the content data that is being upconverted. Then, the main control unit 7 determines whether the content data B having a lower preference level than the content data A is being upconverted. If the content data B is not being upconverted (NO in step S14), in step S17, the main control unit 7 starts upconverting the content data A. On the other hand, if the content data B is being upconverted (YES in step S14), the processing advances to step S15.

In step S15, the main control unit 7 instructs the storage unit 3 to store information about the progress of upconversion processing being executed in the upconversion processing unit 10 as content information. For example, in the case of upconverting content data in order from the top, the storage unit 3 stores how much (how many frames) upconversion processing is completed. In the case of performing upconversion processing in a plurality of steps, for example, converting a resolution and increasing the number of frames, the storage unit 3 stores how much the upconversion processing proceeds.

In step S16, the main control unit 7 instructs the upconversion processing unit 10 to stop the upconversion processing being executed. Then, in step S17, the main control unit 7 instructs the upconversion processing unit 10 to start upconverting of the upconversion-target content data A. As for the content data that is interrupted in upconversion processing, the upconversion processing unit 10 restarts upconversion processing from where the upconversion processing unit 10 left off, based on the information about the progress of processing.

After upconversion processing of the content data which is at the top of the upconversion processing order is completed through the series of operations from steps S10 to S17, the main control unit 7 carries out upconversion processing on content data that ranks next. As described above, the main control unit 7 determines the upconversion processing order based on user's preference information to thereby execute upconversion processing in order from the content data having a higher preference level.

As described above, according to the present embodiment, the main control unit 7 can upconvert a plurality of stored content data in an appropriate procedure. Accordingly, the main control unit 7 can upconvert contents desired by a user to a viewable form with a high quality as soon as possible.

A second exemplary embodiment of the present invention describes an example in which the upconversion processing order is calculated based on an estimated processing time necessary to upconvert each content data. The second exemplary embodiment is especially effective in such a case that a user wants to view all content data with a high quality.

Figure 7:
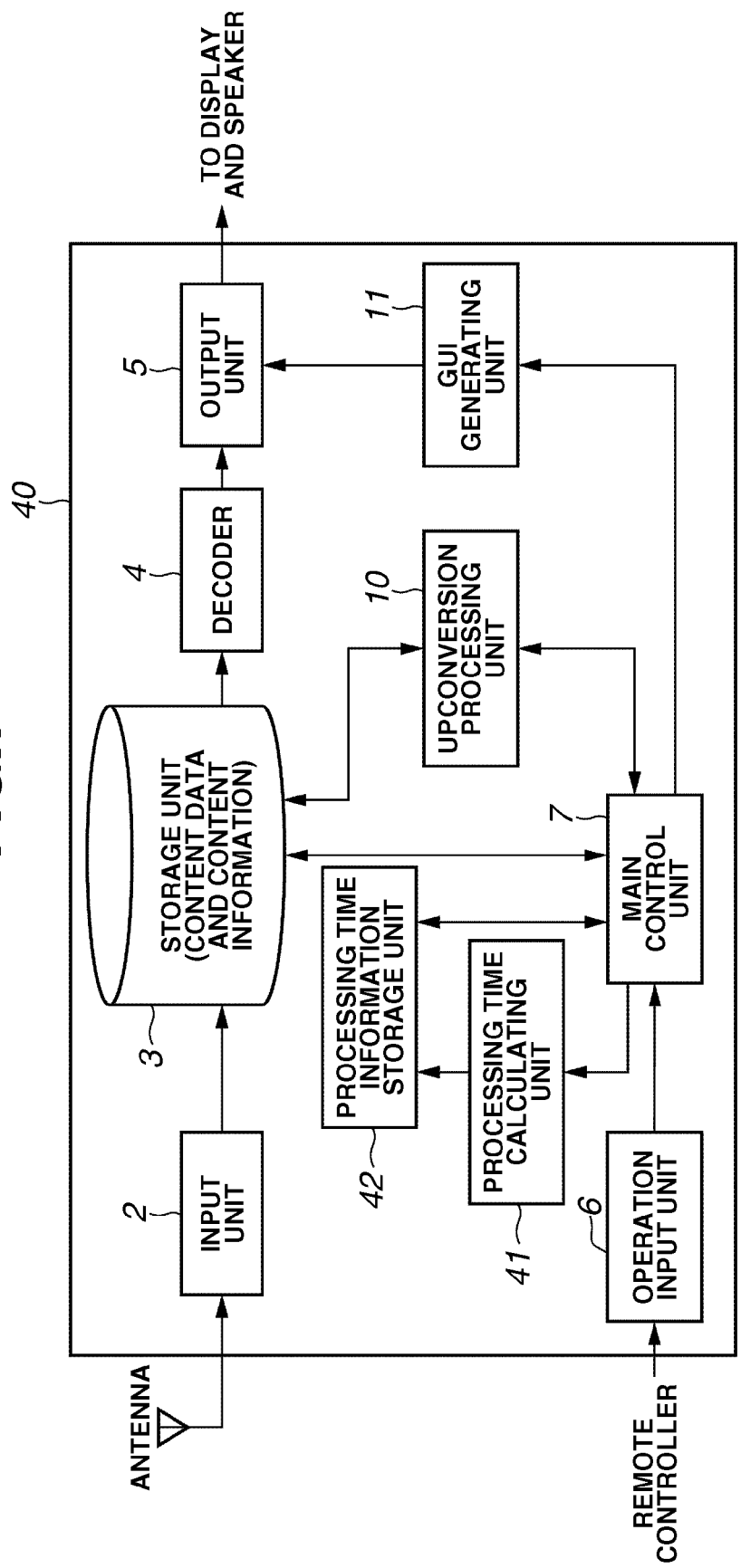
FIG. 7 is an example block diagram illustrating a configuration of a signal processing apparatus according to a second exemplary embodiment of the present invention.

FIG. 7 is a block diagram illustrating a configuration of a signal processing apparatus 40 of the present embodiment. The configuration of FIG. 7 differs from that of FIG. 1 in that the preference information generating unit 8 and the preference information storage unit 9 of FIG. 1 are replaced by a processing time calculating unit 41 and a processing time information storage unit 42. Further, functional blocks identical to those of FIG. 1 are denoted by the same reference numerals and thus not described in detail herein.

In the present embodiment, a component descriptor in content information is used. The component descriptor is one of the descriptors of an event information table (EIT) in service information (SI) specified by the ARIB standards. The component descriptor describes information about each component such as a video component or an audio component (component information).

FIG. 8 illustrates an example of the data structure of the component descriptor. The component descriptor includes "stream_content (content information)", "component_type (component type)", "text_char (component descriptor)", etc.

FIG. 9 is a detailed description of "stream_content (content information)" and "component_type (content type)". For example, a content having "stream_content" 0x01 and "component_type" 0xB4 has a video format of 1080i (interlaced scanning type with 1902×1080 pixels) and an aspect ratio 16:9.

The processing time information storage unit 42 stores reference processing time information necessary for upconverting content data of each "component_type (content type)". The storage unit 3 and the processing time information storage unit 42 are not necessarily separated. The processing time information storage unit 42 and the storage unit 3 can be integrated.

FIG. 10 illustrates an example of a reference processing time information table stored in the processing time information storage unit 42 of FIG. 7. For example, the reference processing time necessary to upconvert 1 hour of content data of "component_type" 0xB2 is 2.5 hours. Such a reference processing time information table is stored in the processing time information storage unit 42 in advance.

Figure 11:
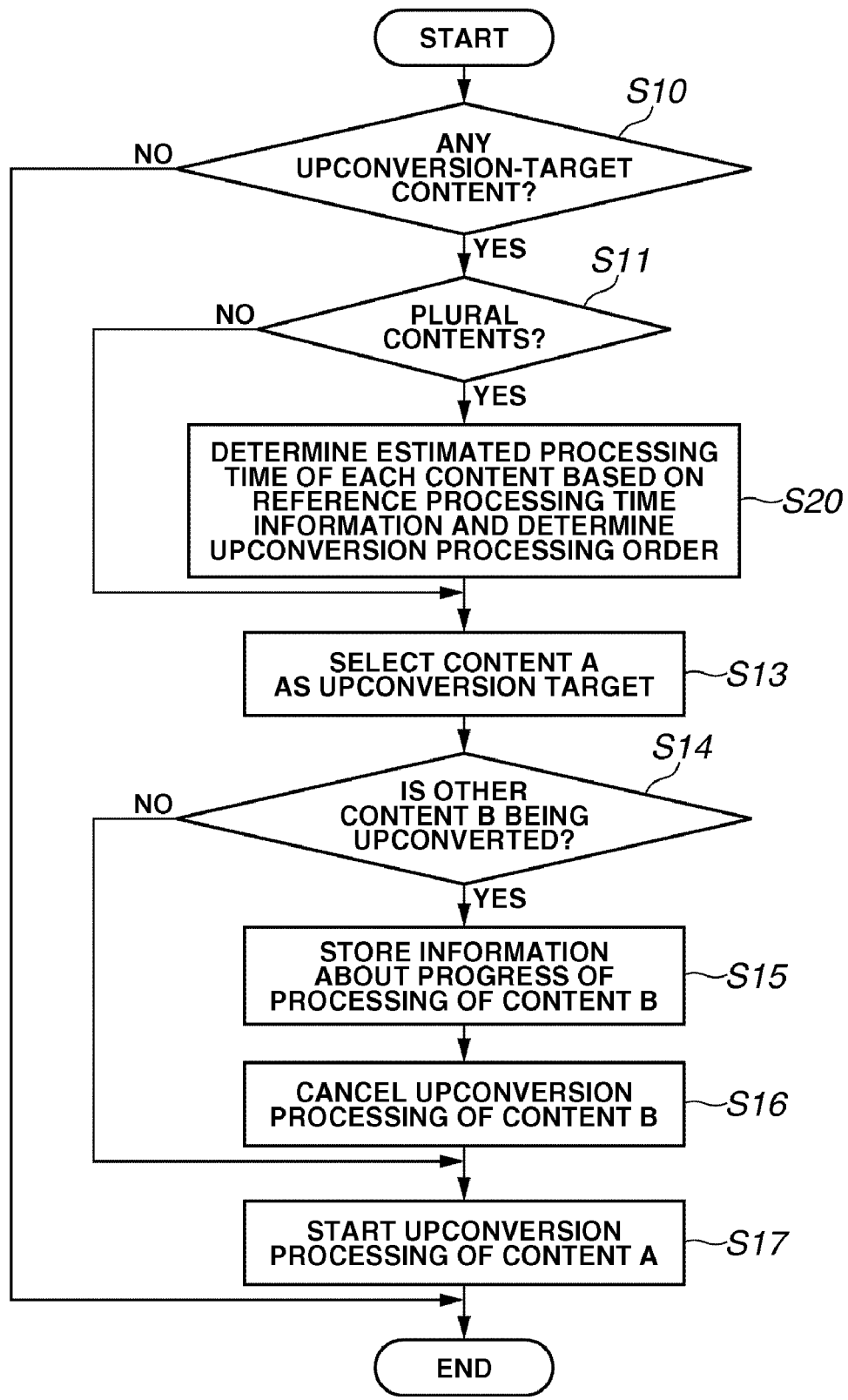
FIG. 11 is an example flowchart illustrating an upconversion processing procedure of the second exemplary embodiment.

FIG. 11 is a flowchart illustrating a procedure for determining the upconversion processing order through executing the upconversion processing according to the present embodiment. The procedure in FIG. 11 differs from the operation in FIG. 5 in that step S20 is carried out instead of step S12 of FIG. 5. Steps similar to those of FIG. 5 are denoted by identical reference numerals and thus not described in detail herein.

In step S20, the main control unit 7 first determines the upconversion processing order of a plurality of content data stored in the storage unit 3. More specifically, the main control unit 7 receives content information of each content data in the storage unit 3 and extracts recording time (content playing time) information and component information. Then, the main control unit 7 instructs the processing time calculating unit 41 to calculate an estimated processing time necessary to upconvert each content data.

The processing time calculating unit 41 reads the reference processing time information table stored in the processing time information storage unit 8 and multiplies a recording hour (content playing time) by the reference processing time per hour to determine the estimated processing time necessary to upconvert each content data. The main control unit 7 determines the upconversion processing order so that a content having a shorter estimated processing time which is calculated by the processing time calculating unit 41 is upconverted earlier. Further, the processing time calculating unit 41 calculates a time necessary to restart upconversion processing for content data that was interrupted in the upconversion processing from where the unit left off, based on the information about the progress of processing, as an estimated processing time.

FIG. 12 illustrates an example of the determined upconversion processing order. For example, a program "Japanese History" has "component_type (content type)" of 0xA2, the video format of 480p (progressive scanning type with 720× 480 pixels) and an aspect ratio of 16:9.

Referring to the reference processing time information table of FIG. 10, a reference time necessary to upconvert one hour of a content of a video format 480p is 4 hours. Thus, if a recording time of the program "Japanese History" (content playing time) is 3 hours, an estimated processing time is 4×3=12 hours. In this way, the estimated processing time of each content is calculated, and the upconversion processing order is determined so that a content having a shorter estimated processing time is upconverted earlier (the order of "Genesis of Earth", "Gourmet Matchup", and "Japanese History").

FIGS. 13A and 13B illustrates an effect of upconverting content data in order from content data having the shortest requisite time for upconversion processing according to the present embodiment. FIG. 13A illustrates a comparative example of the present embodiment, and FIG. 13B illustrates a procedure of the upconversion processing of the present embodiment. In FIGS. 13A and 13B, program contents X, Y, and Z require 3 hours, 6 hours, and 3 hours to upconvert, respectively.

In FIG. 13A, data is upconverted in the order that programs were recorded. In this case, at 17 o'clock when the program content X has been all recorded, the main control unit 7 starts upconverting the program content X. At 19 o'clock when the program content Y has been all recorded, the program content X is being upconverted. Accordingly, the main control unit 7 continues the upconversion processing of the program content X. At 20 o'clock, if the main control unit 7 completes the upconversion processing of the program content X, then the main control unit 7 starts upconverting of the program content Y. The main control unit 7 completes the upconversion processing of the program content Y at 2 o'clock, and completes the upconversion processing of the program content Z at 5 o'clock.

In FIG. 13B, data is upconverted in order from content data having the shortest estimated processing time necessary for upconversion processing. In this case, at 19 o'clock when the program content Y has been all recorded, the main control unit 7 compares an estimated processing time necessary to upconvert the program content X and an estimated processing time necessary to upconvert the program content Y. The comparison result reveals that the program content X can be all upconverted in an hour, while the program content Y requires 6 hours to upconvert. Accordingly, the main control unit 7 continues upconversion processing of the program content X. Then, at 20 o'clock, the main control unit 7 completes the upconversion processing of the program content X, and starts the upconversion processing of the program content Y.

Next, at 21 o'clock when the program content Z has been all recorded, the main control unit 7 compares the estimated processing time necessary to upconvert the program content Y and an estimated processing time necessary to upconvert the program content Z. The comparison result reveals that the program content Y requires 5 hours to finish upconverting, while the program content Z can be all upconverted in 3 hours. Accordingly, the main control unit 7 stops upconverting of the program content Y and starts upconverting of the program content Z. Then, at 24 o'clock when the main control unit 7 completes the upconversion processing of the program content Z, the main control unit 7 restarts upconverting of the program content Y.

As described above, in the present embodiment, the main control unit 7 can provide a user with as many upconverted content data as possible and as quickly as possible. More specifically, the present embodiment can provide the second upconverted content data for a user 2 hours earlier than the comparative example (FIG. 13A). Further, in the comparative example (FIG. 13A), even if a user wishes to view the program content Z with a high quality at once, the user needs to wait until 5 o'clock. In contrast, in the example of FIG. 13B, a user can view the program content Z with a high quality at 24 o'clock.

Hence, according to the present embodiment, a plurality of stored content data can be upconverted in an appropriate procedure. Therefore, the main control unit 7 can upconvert contents requested by a user to a viewable form with a high quality as soon as possible. In particular, in a case where content data includes a program content that requires a long time to upconvert, the present embodiment can avoid making other program contents wait to start upconverting.

According to the present embodiment, an estimated processing time necessary to upconvert each content data is calculated using reference processing time information, but can be calculated by another method. For example, the main control unit 7 can control the upconversion processing unit 10 to actually upconvert a head portion of each content (5 seconds from the beginning, for example) to calculate total time necessary for the processing. In this case, the main control unit 7 can calculate an estimated processing time necessary to upconvert the entire content data based on the time necessary to process the head portion.

A third exemplary embodiment of the present invention combines the configuration of the first exemplary embodiment with the configuration of the second exemplary embodiment. That is, an upconversion processing order is determined based on user's preference information and an estimated processing time necessary to upconvert each content data.

Figure 14:
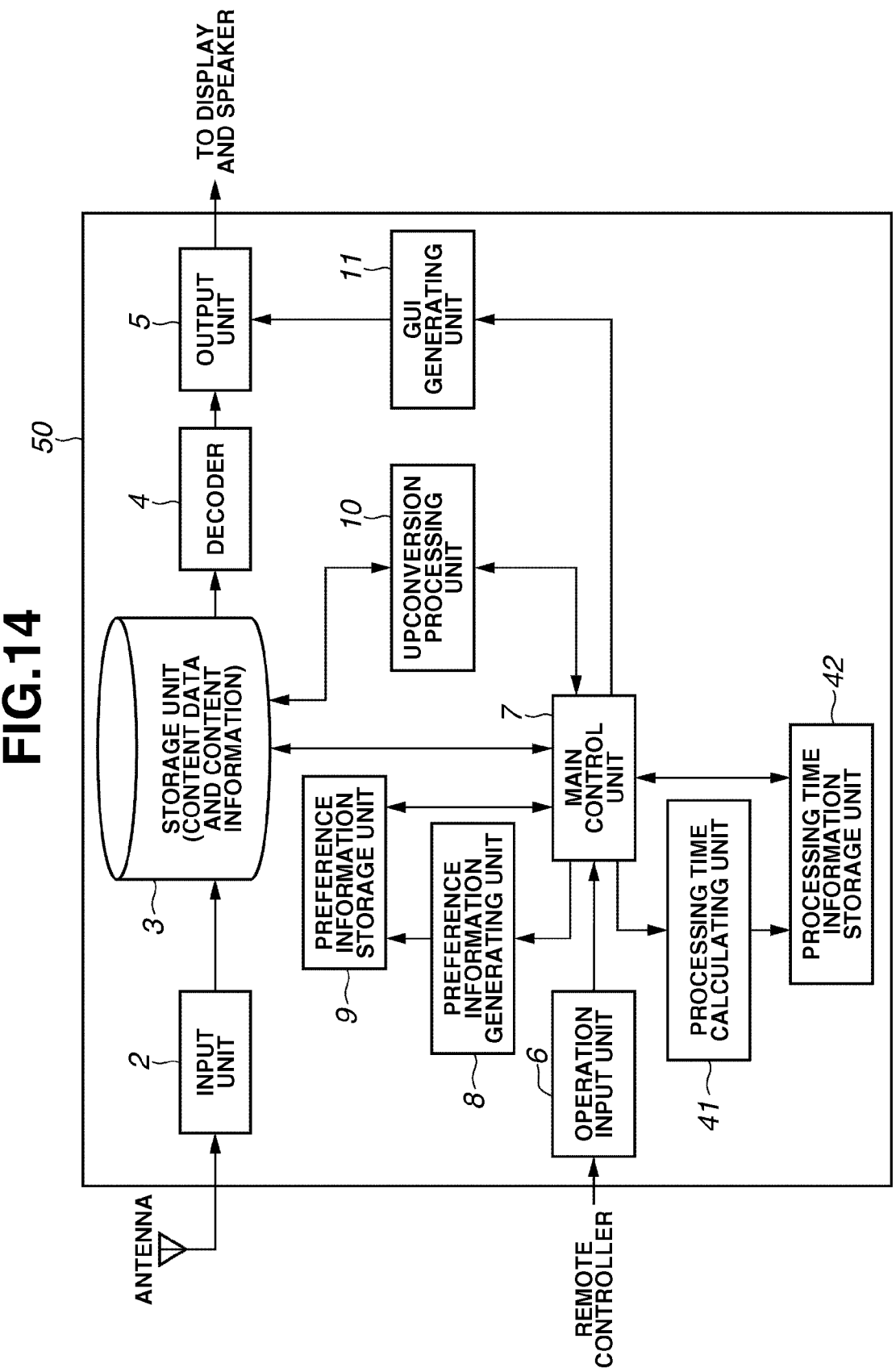
FIG. 14 is an example block diagram illustrating a configuration of a signal processing apparatus according to a third exemplary embodiment of the present invention.

FIG. 14 is a block diagram illustrating a signal processing apparatus 50 of the present embodiment. The signal processing apparatus 50 includes the processing time calculating unit 41 and the processing time information storage unit 42 of FIG. 7 in addition to the components of FIG. 1. In FIG. 14, functions of blocks identical to those of the first and second exemplary embodiments are denoted by the same reference numerals and thus not described in detail herein.

Figure 15:
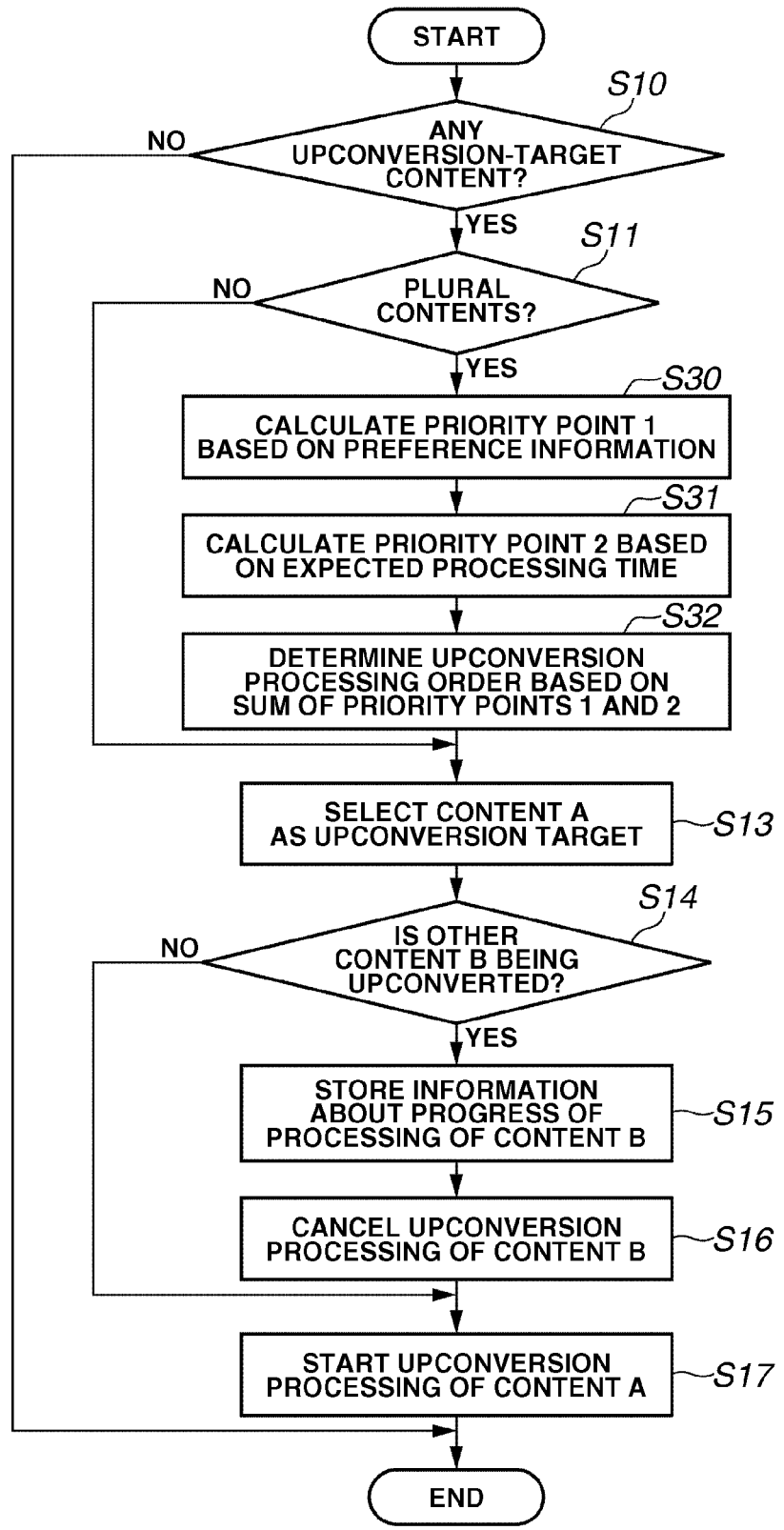
FIG. 15 is an example flowchart illustrating an upconversion processing procedure of the third exemplary embodiment.

FIG. 15 is a flowchart illustrating a procedure for determining the upconversion processing order through executing the upconversion processing in the present embodiment. The procedure of FIG. 15 differs from that of FIG. 5 in that steps S30 to S32 are carried out instead of step S12 of FIG. 5. Steps similar to those of FIG. 5 are denoted by the same reference numerals and thus not described in detail herein.

In step S30, the main control unit 7 checks preference information stored in the preference information storage unit 9 against content information of each content stored in the storage unit 3 to calculate a total of preference levels. Then, the calculated total value of preference levels is set to a priority point 1. The total of the preference level is identical to that of FIG. 6 and thus not described herein.

In step S31, the main control unit 7 instructs the processing time calculating unit 41 to calculate an estimated processing time necessary to upconvert each content data. The processing time calculating unit 41 calculates the estimated processing time necessary to upconvert each content data based on reference processing time information stored in the processing time information storage unit 8 and a recording time of each content (content playing time). The main control unit 7 calculates a priority point 2 based on the estimated processing time calculated by the processing time calculating unit 41.

Next, in step S32, the main control unit 7 determines the upconversion processing order so that a content having a larger value of the priority point 1 and the priority point 2 in total is processed earlier.

FIG. 16 illustrates an example of calculated results of the priority point 1 and the priority point 2. For example, the program "Genesis of Earth" has the priority point 1 of "6" based on a preference level and the priority point 2 of "6" based on an estimated processing time, and the total priority point is "12".

FIG. 17 illustrates a relationship between an estimated processing time and the priority point 2. As illustrated in FIG. 17, the shorter the estimated processing time, the larger the priority point 2. The main control unit 7 determines the upconversion processing order so that a content having a larger total value of priority points is upconverted earlier (the order of "Genesis of Earth", "Japanese History", and "Gourmet Matchup").

In the second exemplary embodiment, the main control unit 7 determines the upconversion processing order to upconvert a content having a shorter estimated processing time earlier, while in the present embodiment, the main control unit 7 also considers a user's preference level to determine the processing order. Therefore, the main control unit 7 can quickly upconvert a content having a short estimated processing time and a high user's preference level.

Hence, according to the present embodiment, the main control unit 7 can upconvert a plurality of stored content data in a more appropriate procedure. Therefore, the main control unit 7 can upconvert contents desired by a user to a viewable form with a high quality as soon as possible.

According to a fourth exemplary embodiment of the present invention, a user can specify an upconversion processing order. A configuration of a signal processing apparatus of the fourth exemplary embodiment is similar to the first exemplary embodiment as illustrated in FIG. 1, the second exemplary embodiment as illustrated in FIG. 7, or the third exemplary embodiment as illustrated in FIG. 14.

In the fourth exemplary embodiment, the GUI generating unit 11 receives an operation instruction input by a remote controller via the operation input unit 6 and the main control unit 7 to generate an operation screen for changing the upconversion processing order.

Figure 18:
FIG. 18 illustrates an example of an operation screen for changing an order of upconversion processing.

FIG. 18 illustrates an example of the operation screen for changing the upconversion processing order. A user can freely change the processing order of contents in a list of upconversion-target contents displayed on a screen by pushing an "up button" and "down button" of a remote controller.

As illustrated in FIG. 19, the apparatus can be configured to enable a user to specify the upconversion-target contents on the screen displaying a list of stored contents and set the processing order of the specified contents as desired. In this case, even if the signal processing apparatus does not have a function of automatically determining the upconversion processing order, a user can specify the upconversion-target contents and set the processing order of the specified contents.

The processing described in the above embodiments can be realized by providing a storage medium, storing program code of software realizing the above-described functions, to a computer system or apparatus. By reading the program code stored in the storage medium with a computer (or a central processing unit (CPU) or a microprocessor unit (MPU)) of the system or apparatus and executing them, the functions of the above-described embodiments can be realized. In this case, the program code read from the storage medium realizes the functions according to the embodiments, and the storage medium storing the program code constitutes the present invention. The storage medium, such as a floppy disk, a hard disk, an optical disk, a magneto-optical disk and the like can be used for providing the program code. Also, compact disk-read only memory (CD-ROM), CD-recordable (CD-R), a magnetic tape, a non-volatile memory card, ROM, and the like can be used.

Furthermore, the functions according to the above embodiments are realized not only by executing the program code read by the computer. The present invention also includes a case where an operating system (OS) or the like working on the computer performs part or the entire processes in accordance with designations of the program code and realizes the functions according to the above embodiments.

Furthermore, the program code read from the storage medium can be written in a function expansion card which is inserted into the computer or in a memory provided in a function expansion unit which is connected to the computer. Thereafter, a CPU or the like contained in the function expansion card or unit can perform part or the entire processes in accordance with designations of the program code and can realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-123409 filed May 8, 2007, which is hereby incorporated by reference herein in its entirety.

What is claimed is:

1. A signal processing apparatus that upconverts a plurality of content data, comprising:

an operation unit configured to receive an operation instruction from a user;

a generating unit configured to generate user's preference information based on an operation history corresponding to the operation instruction;

a processing unit configured to upconvert the plurality of content data; and a control unit configured to calculate a preference level of each content data based on the user's preference information and content information about each content data and to preferentially upconvert content data having a high preference level; and a calculating unit configured to calculate an estimated processing time necessary to upconvert each of the plurality of content data, wherein the control unit preferentially upconverts content data having a shortest estimated processing time.

2. The signal processing apparatus according to claim 1, wherein the control unit controls an upconversion processing order to upconvert content data having a higher preference level earlier than content data having a lower preference level.

3. The signal processing apparatus according to claim 2, wherein at a time of upconverting first content data, if second content data having a preference level lower than the preference level of the first content data is being upconverted, the control unit stops upconverting of the second content data and starts upconverting of the first content data.

4. The signal processing apparatus according to claim 1, wherein the content data requires a longer time for upconversion than an actual playing time of the content data.

5. A signal processing apparatus that upconverts a plurality of content data, comprising:

a calculating unit configured to calculate an estimated processing time necessary to upconvert each of the plurality of content data;

a processing unit configured to upconvert the plurality of content data; and a control unit configured to preferentially upconvert content data having a shortest estimated processing time; and wherein the calculating unit calculates the estimated processing time necessary to upconvert each content data based on a type of each of the plurality of content data and reference processing time information as a reference of requisite time for upconversion processing for each type of the content data.

6. The signal processing apparatus according to claim 5, wherein the processing unit upconverts a portion of each of the plurality of content data, and the calculating unit calculates the estimated processing time necessary to upconvert each content data based on a time necessary to upconvert the portion of the data.

7. The signal processing apparatus according to claim 5, wherein at a time of upconverting first content data, if second content data having an estimated processing time longer than the estimated processing time of the first content data is being upconverted, the control unit stops upconverting of the second content and starts upconverting of the first content data.

8. A method for upconverting a plurality of content data, the method comprising:
   receiving an operation instruction from a user;
   generating user's preference information based on an operation history corresponding to received operation instruction;
   upconverting the plurality of content data;
   calculating a preference level of each content data based on generated preference information and content information about each content data; and
   performing control to preferentially upconvert content data having a high preference level; and
   calculating an estimated processing time necessary to upconvert each of the plurality of content data; and
   performing control to preferentially upconvert content data having a shortest estimated processing time.

9. The method according to claim 8, further comprising:
   controlling an upconversion processing order to upconvert content data having a higher preference level earlier than content data having a lower preference level.

10. The method according to claim 9, further comprising:
    stopping, at the time of upconverting first content data if second content data having a preference level lower than the preference level of the first content data is being upconverted, upconversion processing of the second content data and starting upconversion processing of the first content data.

11. The method according to claim 8, wherein the content data requires a longer time to upconvert than an actual playing time of the content data.

12. A method for upconverting a plurality of content data, the method comprising:
    calculating an estimated processing time necessary to upconvert each of the plurality of content data;
    upconverting the plurality of content data; and
    performing control to preferentially upconvert content data having a shortest estimated processing time; and
    wherein the estimated processing time necessary to upconvert each content data is calculated based on a type of each of the plurality of content data and reference processing time information as a reference of requisite time for upconversion processing for each type of the content data.

13. The method according to claim 12, further comprising:
    upconverting a portion of each of the plurality of content data; and
    calculating the estimated processing time necessary to upconvert each content data based on a time necessary to upconvert the portion of the data.

14. The method according to claim 12, further comprising:
    stopping, at a time of upconverting first content data if second content data having an estimated processing time longer than the estimated processing time of the first content data is being upconverted, upconversion processing of the second content data and starting upconversion processing of the first content data.

* * * * *